United States Patent [19]

Wideman et al.

[11] Patent Number: 4,914,157

[45] Date of Patent: Apr. 3, 1990

[54] ENHANCING CURE RATES OF RUBBER

[75] Inventors: Lawson G. Wideman, Tallmadge; Thomas J. Botzman, Stow; George Jalics, Akron, all of Ohio

[73] Assignee: The Goodyear Tire & Rubber Company, Akron, Ohio

[21] Appl. No.: 249,489

[22] Filed: Sep. 26, 1988

[51] Int. Cl.$^4$ .......................... C08L 23/26; C08L 9/00; C08L 15/00; C08L 7/00

[52] U.S. Cl. .................................... 525/192; 525/232; 525/236; 525/237; 525/338; 525/383; 525/331.7

[58] Field of Search ...................... 525/192, 383, 331.7, 525/236, 237

[56] References Cited

U.S. PATENT DOCUMENTS

| | | | |
|---|---|---|---|
| 2,544,555 | 3/1951 | Jones et al. ........................... | 525/383 |
| 3,278,480 | 10/1966 | Radcliff et al. ....................... | 525/192 |
| 3,311,598 | 3/1967 | Mertzweiller et al. .......... | 525/331.7 |
| 3,334,076 | 8/1967 | Mertzweiller et al. ............. | 525/383 |
| 3,383,426 | 5/1968 | Cull et al. ............................. | 525/383 |
| 3,475,362 | 10/1969 | Romanick et al. .................. | 525/237 |
| 3,539,654 | 11/1970 | Pautrat et al. ....................... | 525/383 |

OTHER PUBLICATIONS

Ramp et al., J. Polymer Sci. Part A-1(4 vol.), 2267-2279 (1966), "Hydroformylation of High Polymers".

*Primary Examiner*—Carman J. Seccuro
*Attorney, Agent, or Firm*—Bruce J. Hendricks

[57] ABSTRACT

There is disclosed a process for enhancing the rate of cure of a sulfur vulcanizable rubber. Addition of a hydroformylated rubber to a sulfur vulcanizable rubber enhances the rate of cure and concomitantly improves the rubber/filler interaction of the vulcanized rubber.

18 Claims, No Drawings

ENHANCING CURE RATES OF RUBBER

FIELD OF THE INVENTION

The present invention relates to enhancing the rate of cure of a sulfur vulcanizable rubber by the addition of a hydroformylated rubber.

BACKGROUND OF THE INVENTION

The "rate of cure" is the rate at which crosslinking, and the development of the stiffness (modulus) of the compound occur after the scorch point. As the compound is heated past the scorch point, the properties of the compound change from a soft plastic to a tough elastic material required for use. During the curing step, crosslinks are introduced, which connect the long polymer chains of the rubber together. As more crosslinks are introduced, the polymer chains become more firmly connected and the stiffness or modulus of the compound increases. The rate of cure is an important vulcanization parameter since it in part determines the time the compound must be cured, i.e., the "cure time". In the manufacture of vulcanized rubber articles, significant cost savings can be realized through a reduction of time the article is required to spend in the mold. Through enhanced rates of cure, the mold time required to meet minimum "states of cure" can be reduced.

The preparation of hydroformylated rubbers has been described in the prior art. For example, the hydroformylation of diene based polymers was disclosed in Ramp et al, J. Polymer Sc., Part A-1, 4, 2267–2279 (1966). In addition, the chemical modification of polybutadiene via homogeneous hydrogenation and hydroformylation was discussed in Mohammodi et al, Polymer Preprints, 27, No. 2, (Sept. 1986). Whereas these polymers are known, there has yet to be any practical utility for these compounds.

After extensive research, it has been discovered, that the hydroformylated rubber may be used to shorten the rates of cure of a sulfur vulcanizable rubber. This new use not only broadens the applications for hydroformylated rubber but enhances the cure of vulcanizable rubber in the absence of imparting undesirable properties to the vulcanizate.

SUMMARY OF THE INVENTION

The present invention relates to a process for enhancing the rate of cure of sulfur vulcanizable rubber by addition of hydroformylated rubber.

DETAILED DESCRIPTION OF THE INVENTION

The present invention relates to a method for enhancing the rate of cure of a sulfur vulcanizable rubber by the addition of a hydroformylated rubber. For the purposes of description herein, the terms "hydroformylated rubber" and "oxo rubber" are used interchangeably and are to be understood to be the product of a rubber containing olefinic unsaturation which has been subjected to hydroformylation conditions in the presence of a hydroformylation catalyst, organic solvent, hydrogen and carbon monoxide. Suitable rubbers to be hydroformylated must contain olefinic unsaturation. The phrase "rubber containing olefinic unsaturation" is intended to include both natural and all its various raw and reclaim forms as well as various synthetic rubbers. Representative synthetic polymers are the homopolymerization products of butadiene and its homologues and derivatives, as for example, methylbutadiene, dimethylbutadiene and pentadiene as well as copolymers such as those formed from butadiene or its homologues or derivatives with other unsaturated organic compounds. Among the latter are acetylene e.g. vinyl acetylene: olefins, for example, isobutylene, which copolymerizes with isoprene to form polyisobutylene, also known as butyl rubber: vinyl compounds, for example vinylchloride, acrylic acid, acrylonitrile (which polymerize with butadiene to form Buna-N rubber), methacrylic acid and styrene, the latter compound polymerizing with butadiene to form Buna-S rubber, as well as vinyl esters and various unsaturated aldehydes, ketones and ethers, e.g., acrolein, methyl isopropenyl ketone and vinylethyl ether. Included amongst the various synthetic rubbers are those prepared by the homopolymerization of isoprene and the copolymerization of isoprene with other diolefins and various unsaturated organic compounds. In addition, synthetic rubbers such s EPDM, 1,4-cis polybutadiene and 1,4-cis polyisoprene may be used as well as polyhalogenated rubbers, i.e., chloroprene. The preferred rubbers to be hydroformylated are polybutadiene, polyisobutylene, EPDM, polybutadiene-styrene copolymers and polyisoprene. The preparation of the rubber prior to the hydroformylation is according to general methods known to those skilled in the art and is not part of the present invention.

A particularly preferred cure enhancer is a hydroformylated EPDM which is prepared according to a process comprising reacting EPDM with carbon monoxide and hydrogen under hydroformylation conditions in the presence of a hydroformylation catalyst and organic reaction solvent.

The rubber containing olefinic unsaturation is subjected to hydroformylation conditions while in the presence of a mixed gas composed of carbon monoxide and hydrogen. Such gas is commonly known as water gas, syngas or oxo gas. The relative amounts of carbon monoxide and hydrogen which are initially present in the feed gas to the reactor may be varied over a wide range. In general, the mole ratio of carbon monoxide to hydrogen is in the range of between about 30:1 to about 1:30, preferably between about 15:1 and about 1:15 and most preferably between about 10:1 to about 1:10. It is to be understood, however, that molar ratios outside the stated broad range may be employed. In addition to hydrogen and carbon monoxide, other gases may be contained in the feed gas so long as they do not or are not present in sufficient amounts to detrimentally affect the hydroformylation reaction.

An organic solvent may be used to form a cement or suspension of the rubber. The solvent may also be used to suspend or dissolve the hydroformylation catalyst. The solvent is preferably inert to the hydroformylation reaction. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, and the like; ethers such as tetrahydrofuran, tetrahydropyran, diethylether, 1,2-dimethoxybenzene, 1,2-diethoxybenzene, the mono- and dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately provide a sufficient suspension or cement of the rubber and suspend or dissolve the hydroformylation catalyst and not interfere with the hydroformylation reaction.

The hydroformylation of the rubber is conducted in the presence of a hydroformylation catalyst. Conventional hydroformylation catalysts may be used including Group VIII Noble metal-triarylphosphine complex catalysts. Group VIII Noble metal-triarylphosphine complex catalysts are prepared using Group VIII Noble metal compounds, for example, hydrides, halides, carboxylates, nitrates or sulfates, etc. and triarylphosphine by known processes. When using this complex catalyst for the reaction, the complex may be previously prepared from the Group VIII Noble metal compound and triarylphosphine and introducing to the reaction system or the Group VIII Noble compound and the triarylphosphine may be supplied to the reaction system separately to form the complex in the reaction system. Examples of the Group VIII Noble metal compounds that can be used for preparing the complexes include ruthenium compounds such as ruthenium trichloride or tetraminoruthenium hydroxychloride, etc.; rhodium compounds such as rhodium dicarboxylchloride, rhodium nitrate, rhodium trichloride, rhodium acetate or rhodium sulfate, etc.; palladium compounds such as palladium hydride, palladium chloride, palladium iodide, palladium nitrate, palladium cyanide, palladium acetate or palladium sulfate, etc.: osmium compounds such as osmium trichloride or chloroosmic acid, etc.: iridium compounds such as iridium tribromide, iridium tetrabromide, iridium trifluoride, iridium trichloride or iridium carbonyl, etc.; and platinum compounds such as platinic acid, platinous iodide, sodium hexachloroplatinate, or potassium trichloromonoethyleneplatinate, etc. As the triarylphosphine ligand, triphenylphosphine is most suitably used. However, it is possible to use various triarylphosphines having substituents which are inactive with respect to the hydroformylation reaction, such as, for example, substituted triphenylphosphines having a lower alkyl group on the phenyl group such as tri-p-tolylphosphine, tri-m-tolylphosphine, trixylylphosphine or tris(p-ethylphenyl) phosphine, and substituted triphenylphosphines having an alkoxy group on the phenyl group such as tris(p-methoxyphenyl) phosphine, etc. As is known by those skilled in the art, tertiary phosphines such as triarylphosphine, etc. may be allowed, in general, to coexist in the reaction system in order to improve thermal stability of the complex catalyst. The amount of such coexistence can be in excess of ten times to several hundred times (e.g., about 10 to 900) as a molar ratio, based on the moles of the complex catalyst in the reaction system. Other than the above, the hydroformylation catalyst may be a cobalt compound soluble in the reaction mixture. Particularly preferred cobalt compounds include cobalt hydrocarbonyls or cobalt carbonyls such as dicobalt octacarbonyl. Cobalt carbonyl may be prepared in situ by reaction of the syngas on various cobalt salts.

The amount of catalyst that is generally present may range from a concentration of from about 0.01 to about 2.0% by weight of the reaction mixture. Preferably, the hydroformylation catalyst will range from about 0.05 to about 0.5% by weight of the reaction mixture.

The hydroformylation can be effected over a wide temperature range from moderate to elevated temperature. In general, the hydroformylation reaction may be conducted at a temperature of between about 50° C. to about 150° C. The reaction temperature should not exceed 150° C. because in most cases, when operating at the lower end of the temperature range, it is desirable to utilize pressures at the higher end of the range. The preferred temperature range is from about 90° C to about 120° C., while the most preferred temperature range is from about 95° C. to about 110° C.

The hydroformylation reaction is effected under superatmospheric pressure conditions. The pressure is produced by the hydrogen and carbon monoxide containing gas provided to the reactor. Pressures between 10 psig to about 2500 psig may be used to conduct the hydroformylation reaction. In the preferred embodiment, the hydroformylation reaction is conducted at a pressure range of from about 50 to about 250 psig. In addition to the partial pressures exerted by carbon monoxide and hydrogen, a partial pressure will be exerted by any inert gases that may be present in the syngas.

The hydroformylation conditions are continued for a period of time sufficient to produce the desired hydroformylated rubber. In general, the reaction time can vary from minutes to several hours. If the more sluggish reaction conditions are selected, then the reaction time will have to be extended until the desired product is produced. It is appreciated that the residence time of the rubber will be influenced by the reaction temperature, concentration and choice of catalyst, total gas pressure, partial pressure exerted by its components, concentration and choice of solvent, and other factors. Desirably, the hydroformylation reaction is conducted until such time as from about 0.1% to about 5% of the rubber is functionalized or hydroformylated on the remaining olefinic sites of the rubber. Preferably, the reaction is conducted until such time as from about 1% to about 2% of the rubber is functionalized.

The process for the hydroformylation of rubber may be carried out in a batch, semi-continuous or continuous manner. The hydroformylation reaction may be conducted in a single reaction zone or in a plurality of reaction zones, in series or in parallel. The reaction may be conducted intermittently or continuously in an elongated tubular zone or in a series of such zones. The material of construction of the equipment should be such as to be inert during the reaction. The equipment should also be able to withstand the reaction temperatures and pressures. The reaction zone can be fitted with internal and/or external heat exchangers to control undo temperature fluctuations, or to prevent possible run-away reaction temperatures caused by the possible exothermic nature of the reaction. Preferably, an agitation means is available to ensure complete suspension of the carbon black in the solvent. Mixing induced by vibration, shaker, stirrer, rotating, oscillation, etc. are all illustrative of the types of agitation means which are contemplated for use in the present invention. Such agitation means are available and well known to those skilled in the art.

The hydroformylated rubbers enhance the rate of cure or vulcanization of sulfur vulcanizable elastomers. The term "sulfur vulcanizable elastomer or rubber" as used herein embraces both natural rubber and all its various raw and reclaim forms as well as various synthetic rubbers. Representative synthetic polymers are the homopolymerization products of butadiene and its homologues and derivatives, as for example, methylbutadiene, dimethylbutadiene and pentadiene as well as copolymers such as those formed from butadiene or its homologues or derivatives with other unsaturated organic compounds. Among the latter are acetylene e.g. vinyl acetylene; olefins, for example, isobutylene, which copolymerizes with isoprene to form butyl rubber; vinyl compounds, for example vinylchloride, acrylic acid, acrylonitrile (which polymerize with butadiene to form Buna-N rubber), methacrylic acid and styrene, the latter compound polymerizing with butadiene to form Buna-S rubber, as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Also included are the synthetic rubbers such as 1,4-cis polybutadiene and 1,4-cis polyisoprene and similar synthetic rubbers such as EPDM. The preferred rubbers for use with the hydroformylated rubber are polybutadiene, butyl rubber EPDM, polybutadiene-styrene copolymers and polyisoprene. It has been discovered that the hydroformylated rubber may be different from the rubber with which it is compounded. In fact, it has been discovered that a wide variety of properties may be achieved if the rubbers are different.

The hydroformylated rubber may be used in a wide variety of proportions. Generally, the level of hydroformylated rubber that may be added to the sulfur vulcanizable rubber may range from about 1 phr (parts per hundred rubber) to about 100 phr. Preferably, the amount of hydroformylated rubber that is added ranges from about 20 phr to about 80 phr.

The hydroformylated rubber may be compounded in either productive or nonproductive stock. Incorporation of the hydroformylated rubber into the sulfur vulcanizable rubber compound may be accomplished by conventional means of mixing such as by the use of Banburys, Brabenders, etc.

The hydroformylated rubbers may be used with any conventional compounding additives such as carbon black, zinc oxide, antidegradants, processing oils, waxes, accelerators, sulfur vulcanizing agents and fatty acids. For the purposes of his invention, "sulfur vulcanizing agents" mean elemental sulfur or sulfur donating vulcanizing agents, for example, an amine disulfide or a polymeric polysulfide. Preferably, the hydroformylated rubber is used with free sulfur.

The following examples are presented in order to illustrate but not limit the present invention.

EXAMPLE 1

Preparation of 1% Oxo HVPBD

A one liter stainless steel autoclave was swept with nitrogen gas and charged with high vinyl polybutadiene (65% vinyl) cement and 100 mg of cobalt carbonyl catalyst. The cement was 40 g of high vinyl polybutadiene (HVPBD) in 400 g of hexane. The reactor was swept with a syngas (1:1 hydrogen:carbon monoxide). The reactor was heated to 100° C. with stirring and the reactor pressure was adjusted to 200 psig. The hydroformylation reaction was continued for ten minutes. The reactor was cooled, vented and the resulting cement dried at 60° C. to a constant weight. 40 g of oxo HVPBD was recovered. Infrared analysis showed the formation of a carbonyl functional group in the high vinyl polybutadiene (HVPBD) at approximately a 1% level.

EXAMPLE 2 and 3

Mixing and Testing Sample

Two rubber compounds were made using the recipe listed in Table I below. Example 2 was conducted as a control for comparative purposes. Example 3 was conducted to illustrate the present invention and the oxo rubber prepared in accordance with the procedure of Example 1 was used. Other than the different HVPBD, the recipe for the two examples of Table I was identical. The carbon black used in Examples 2 and 3 was N-220 having an iodine number surface area of 121 and a DBP structure of 115. Table II below lists the physical properties for the compounds of Examples 2 and 3. Three compounds were tested for each example.

TABLE I

| Ingredients | (Control) Example 2 | Example 3 |
|---|---|---|
| Nonproductive | | |
| HVPBD | 75 | 0 |
| Oxo HVPBD | 0 | 75 |
| Synthetic 1,4-polyisoprene | 25 | 25 |
| Carbon black | 45 | 45 |
| Processing Oil | 9 | 9 |
| Antidegradant | 3 | 3 |
| Wax | 1 | 1 |
| Stearic acid | 3 | 3 |
| Zinc oxide | 3 | 3 |
| Total | 164 | 164 |
| Productive | | |
| Nonproductive | 164 | 164 |
| Accelerator | 1.2 | 1.2 |
| Sulfur | 1.6 | 1.6 |
| Total | 167 | 167 |

TABLE II

| Example | (Control) 2a | (Control) 2b | (Control) 2c | 3a | 3b | 3c |
|---|---|---|---|---|---|---|
| Modulus 100% | 1.52 | 1.45 | 1.57 | 1.61 | 1.68 | 1.55 |
| Modulus 300% | 7.21 | 7.36 | 7.45 | 8.96 | 6.65 | 7.05 |
| Tensile | 15.94 | 15.89 | 12.75 | 16.13 | 14.98 | 15.77 |
| Elongation | 510 | 500 | 450 | 530 | 500 | 510 |
| Tan Delta 0° C. | 0.185 | | | 0.177 | | |
| Tan Delta 60° C. | 0.103 | | | 0.104 | | |
| Maximum Torque | 36.4 | | | 37.0 | | |
| Minimum Torque | 8.6 | | | 9.6 | | |
| t 90 | 24.3 | | | 22.0 | | |
| t 25 | 13.0 | | | 11.0 | | |
| Delta T2 | 10.5 | | | 8.6 | | |

EXAMPLE 4 and 5

The general procedure for mixing and recipe for the compounds of Examples 3 and 4 were repeated except the carbon black component was general purpose tread black having an iodine surface area of 109 and a DBP structure of 124. The physical properties of the compounds for Example 4 (Control) and Example 5 are listed below in Table III.

TABLE III

| Example | (Control) 4a | (Control) 4b | (Control) 4c | 5a | 5b | 5c |
|---|---|---|---|---|---|---|
| Modulus 100% | 1.73 | 1.89 | 1.75 | 1.89 | 2.11 | 2.29 |
| Modulus 300% | 8.44 | 9.06 | 8.54 | 8.71 | 9.52 | 9.19 |
| Tensile | 19.20 | 15.66 | 18.83 | 15.53 | 13.76 | 10.92 |
| Elongation | 505 | 430 | 500 | 430 | 400 | 330 |
| Tan Delta 0° C. | 0.178 | | | 0.181 | | |
| Tan Delta 60° C. | 0.101 | | | 0.101 | | |
| Maximum Torque | 37.6 | | | 40.5 | | |
| Minimum Torque | 9.6 | | | 10.5 | | |
| t 90 | 21.0 | | | 18.6 | | |
| t 25 | 8.1 | | | 6.8 | | |
| Delta T2 | 6.4 | | | 5.2 | | |

EXAMPLES 6 and 7

The general procedure for making and recipe for the compounds of Examples 3 and 4 were repeated except the carbon black component was N-121 having an iodine number surface area of 121 and a DBP structure of 132. The physical properties of the compounds for Example 6 (Control) and Example 7 are listed below in Table IV.

TABLE IV

| Example | (Control) 6a | (Control) 6b | (Control) 6c | 7a | 7b | 7c |
|---|---|---|---|---|---|---|
| Modulus 100% | 3.17 | 3.25 | 2.48 | 3.12 | 2.82 | 2.48 |
| Modulus 300% | 12.87 | 13.89 | 11.98 | 13.28 | 12.50 | 11.57 |
| Tensile | 14.65 | 14.20 | 15.70 | 16.99 | 15.32 | 16.32 |
| Elongation | 320 | 305 | 360 | 360 | 340 | 380 |
| Tan Delta 0° C. | 0.163 | | | 0.170 | | |
| Tan Delta 60° C. | 0.094 | | | 0.101 | | |
| Maximum Torque | 40.7 | | | 40.5 | | |
| Minimum Torque | 11.2 | | | 11.5 | | |
| t 90 | 27.4 | | | 24.5 | | |
| t 25 | 12.0 | | | 12.8 | | |
| Delta T2 | 11.4 | | | 9.9 | | |

EXAMPLES 8 and 9

The general procedure for making and recipe for the compounds of Examples 3 and 4 were repeated except the carbon black component was improved ISAF-high structure N-220 having an iodine number surface area of 122 and a DBP structure of 114. The physical properties of the compounds for Example 8 (Control) and Example 9 are listed below in Table V.

TABLE V

| Example | (Control) 8a | (Control) 8b | (Control) 8c | 9a | 9b | 9c |
|---|---|---|---|---|---|---|
| Modulus 100% | 2.39 | 2.35 | 2.36 | 2.37 | 2.42 | 2.39 |
| Modulus 300% | 10.36 | 11.35 | 10.04 | 11.24 | 10.68 | 11.35 |
| Tensile | 14.14 | 13.50 | 14.96 | 15.97 | 16.93 | 14.54 |
| Elongation | 380 | 330 | 400 | 380 | 400 | 360 |
| Tan Delta 0° C. | 0.188 | | | 0.170 | | |
| Tan Delta 60° C. | 0.111 | | | 0.108 | | |
| Maximum Torque | 37.5 | | | 38.5 | | |
| Minimum Torque | 10.1 | | | 10.7 | | |
| t 90 | 27.1 | | | 23.2 | | |
| t 25 | 15.2 | | | 12.5 | | |
| Delta T2 | 12.1 | | | 9.8 | | |

EXAMPLE 10

Preparation of 1% Oxo EPDM

A one liter stainless steel autoclave was swept with nitrogen gas and charged with an EPDM cement containing 40 g of EPDM and 400 g of hexane, followed by 100 mg of cobalt carbonyl dissolved in 100 ml of hexane. The EPDM was Nordel ® 1470, a product of Dupont of Wilmington, Del. having an ethylene/propylene/ diene weight percent of 57%/37.3%/5.7%. The reactor was then charged with about 100 psig of a 1 to 1 $CO/H_2$ gas mixture. The reactor was heated with stirring to 100° C. and the gas mixture adjusted to and maintained at 200 psig. After 45 minutes, the cement was removed from the reactor, dried to constant weight in a vacuum opened at 60° C. The oxo EPDM was analyzed by infrared spectroscopy for the formyl group which appeared about 1725 $cm^{-1}$. The EPDM had approximately 1% functionality.

EXAMPLES 11 and 12

Sample Mixing and Testing

Two rubber compounds were made using the recipe listed in Table VI below. Example 11 was conducted as a control for comparative purposes. Example 12 was conducted to illustrate the present invention and the oxo EPDM prepared in accordance with the procedure of Example 10 was used. Other than the different EPDM, the recipe for the two examples of Table VI was identical. Table VII below lists the physical properties for the compounds of Examples 11 and 12.

TABLE VI

| Ingredients | (Control) Example 11 | Example 12 |
|---|---|---|
| Nonproductive | | |
| EPDM | 75 | 0 |
| Oxo EPDM | 0 | 75 |
| Synthetic 1,4-polyisoprene | 25 | 25 |
| Carbon black | 45 | 45 |
| Processing oil | 9 | 9 |
| Antidegradant | 3 | 3 |
| Wax | 1 | 1 |
| Stearic acid | 3 | 3 |
| Zinc oxide | 3 | 3 |
| Total | 164 | 164 |
| Productive | | |
| Nonproductive | 164 | 164 |
| Accelerator | 1.2 | 1.2 |
| Sulfur | 1.6 | 1.6 |
| Total | 167 | 167 |

TABLE VII

| | (Control) Example 11 | Example 12 |
|---|---|---|
| Delta Torque | 18.1 | 18.5 |
| Maximum Torque | 30.0 | 31.0 |
| Minimum Torque | 11.9 | 12.5 |
| t 90 | 31.5 | 29.0 |
| t 25 | 10.7 | 9.3 |
| Delta T2 | 8.8 | 7.4 |

EXAMPLE 13

Preparation of 0.5% Oxo SBR

A one liter stainless steel autoclave was swept with nitrogen gas and charged with SBR cement and 100 mg of cobalt carbonyl catalyst. The cement was 500 g of hexane and 30 g of a 55 Mooney SBR that was hydrogenated with a nickel catalyst to greater than 90%. The reactor was swept with a syngas (1:1 hydrogen:carbon monoxide). The reactor was heated to 100° C. with stirring and the reactor pressure was adjusted to 200 psig. The hydroformylation reaction was continued for 1 hour. The reactor was cooled, vented and the resulting cement was dried at 60° C. to a constant weight. 30 g of oxo SBR was recovered. Infrared analysis showed the formation of a carbonyl functional group in the SBR at approximately a 0.5% level.

EXAMPLE 14

Preparation of 1% Oxo SBR

A run was carried out under the procedure and conditions of Example 13 except the hydroformylation catalyst was 100 mg of HRhCO(PPh$_3$)$_3$ predissolved in 20 ml of toluene, and the reactor was heated to 70°–75° C. with stirring and 200 psig of 1 to 1 (hydrogen:carbon monoxide) syngas for 90 minutes. Infrared analysis showed the formation of a carbonyl functional group in the SBR at approximately a 1% level.

EXAMPLES 15–17

Sample Mixing and Testing

Three rubber compounds were made using the recipe listed in Table XIII below. Example 15 was conducted as a control for comparative purposes. Examples 16 and 18 were conducted to illustrate the present invention and the oxo SBR prepared in Example 13 and the oxo SBR rubber of Example 14 were used. Other than the different SBR, the recipe for the three examples of Table VIII was identical. Table IX below lists the physical properties for the compounds of Examples 15–17.

TABLE VIII

| Ingredients | (Control) Example 15 | Example 16 | Example 17 |
|---|---|---|---|
| Nonproductive | | | |
| SBR | 75 | 0 | 0 |
| .5% Oxo SBR | 0 | 75 | 0 |
| 1% Oxo SBR | 0 | 0 | 75 |
| Synthetic 1,4-polyisoprene | 25 | 25 | 25 |
| Carbon black | 45 | 45 | 45 |
| Processing oil | 9 | 9 | 9 |
| Antidegradant | 3 | 3 | 3 |
| Wax | 1 | 1 | 1 |
| Stearic acid | 3 | 3 | 3 |
| Zinc oxide | 3 | 3 | 3 |
| Total | 164 | 164 | 164 |
| Productive | | | |
| Nonproductive | 164 | 164 | 164 |
| Accelerator | 1.2 | 1.2 | 1.2 |
| Sulfur | 1.6 | 1.6 | 1.6 |
| Total | 167 | 167 | 167 |

TABLE IX

| Example | 15 | 16 | 17 |
|---|---|---|---|
| t 90 | 26.0 | 24.9 | 19.5 |
| t 25 | 11.6 | 10.5 | 7.1 |
| Delta T2 | 9.5 | 8.3 | 5.1 |

As can be seen from Tables II–V, VII and IX, the values for t 25 (time required to achieve 25% of the ultimate torque observed for the compound on the rheometer), t 90 (time required to achieve 90% of the ultimate torque observed for the compound on the rheometer) and Delta T2 (time for a 2 point rise on the rheometer) are consistently lower for the compounds containing oxo rubber versus the control. In addition, the remaining data in the tables demonstrate that the incorporation of an oxo rubber does not have a detrimental effect on other physical properties and in fact improves modulus and tensile properties.

Many modifications may be made in the process of this invention by those skilled in the art without departing from the spirit and scope thereof which is defined only by the appended claims.

What is claimed is:

1. A, method for enhancing the rate of cure of a sulfur vulcanizable rubber comprising adding to the sulfur vulcanizable rubber an amount of hydroformylated rubber effective to enhance the rate of cure of said sulfur vulcanizable rubber, said hydroformylated rubber being prepared from a rubber containing olefinic unsaturation.

2. The method of claim 1 wherein from about 1 to about 100 phr of hydroformylated rubber is added to the sulfur vulcanizable rubber.

3. The method of claim 1 wherein from about 20 to about 80 phr of hydroformylated rubber is added to the sulfur vulcanizable rubber.

4. The method of claim 1 wherein the sulfur vulcanizable rubber is selected from the group consisting of natural rubber polybutadiene, polyisoprene, butyl rubber, EPDM, styrene/butadiene copolymers, terpolymers of acrylonitrile, butadiene and styrene, and blends thereof.

5. The method of claim 1 wherein the hydroformylated rubber is prepared according to a process comprising reacting a rubber with carbon monoxide and hydrogen under hydroformylation conditions in the presence of a hydroformylation catalyst and organic reaction solvent.

6. The method of claim 5 wherein said rubber having olefinic unsaturation is suspended in the organic solvent.

7. The method of claim 5 wherein said hydroformylation catalyst is dissolved in the organic solvent.

8. The method of claim 5 wherein said catalyst is a cobalt containing compound.

9. The method of claim 5 wherein said rubber having olefinic unsaturation is selected from the group consisting of natural rubber and synthetic rubbers.

10. The method of claim 9 wherein said synthetic rubber is selected from the group consisting of homopolymerization and copolymerization products of butadiene, methylbutadiene, dimethylbutadiene and pentadiene.

11. The method of claim 9 wherein said synthetic rubber is a copolymerization product of butadiene and at least one member selected from the group consisting of vinyl acetylene, isobutylene, isoprene, vinylchloride, acrylic acid, acrylonitrile, methacrylic acid, styrene, acrolein, methyl isopropenyl ketone and vinylethyl ether.

12. The method of claim 9 wherein said synthetic rubber is selected from the group consisting of polyisoprene and the copolymerization product of isoprene with another diolefin.

13. The method of claim 9 wherein said synthetic rubber is selected from the group consisting of 1,4-cis polybutadiene, 1,4-cis polyisoprene, EPDM and polybutadiene-styrene copolymer.

14. The method of claim 5 wherein said catalyst is a Group VIII Noble metal-triarylphosphine complex and the Group VIII Noble metal is selected from the group consisting of ruthenium, rhodium, palladium, osmium, iridium and platinum.

15. The method of claim 14 wherein a triarylphosphine ligand is used to prepare the Group VIII Noble metal-triarylphosphine complex and is selected from the group consisting of triphenylphosphine, tri-p-tolylphosphine, tri-m-tolylphosphine, trixylylphosphine, tris(p-ethylphenyl) phosphine and tris(p-methoxyphenyl) phosphine.

16. The method of claim 8 wherein said cobalt containing compound is selected from the group consisting of a cobalt carbonyl or cobalt hydrocarbonyl.

17. The method of claim 5 wherein the organic reaction solvent is inert to the hydroformylation reaction conditions.

18. The method of claim 5 wherein the solvent is selected from the group consisting of saturated hydrocarbons, aromatic hydrocarbons, ethers, fluorinated hydrocarbons, and sulfones.

* * * * *